United States Patent [19]
Searle et al.

[11] Patent Number: 5,603,089
[45] Date of Patent: Feb. 11, 1997

[54] BASE STATION ANTENNA ARRANGEMENT

[76] Inventors: Jeffrey G. Searle, 5 Langdon Lane, Galmpton, Brixham, Devon TQ5 OPQ; Stuart J. Dean, 20 Southfield Road, Paignton, Devon TQ3 2SU; Keith R. Broome, 8 Seaton Close, Babbacombe, Torquay, Devon TQ1 3UH; Peter J. Chrystie, 32 Stoke Gabriel Road, Galmpton, Brixham, Devon TQ5 ONQ; Christopher R. Cox, "Channel View", Rickham, East Portlemouth, Salcombe, Devon TQ8 PJ, all of United Kingdom

[21] Appl. No.: 531,599

[22] Filed: Sep. 21, 1995

Related U.S. Application Data

[63] Continuation of Ser. No. 137,834, Oct. 15, 1993, abandoned.

[30] Foreign Application Priority Data

Oct. 19, 1992 [EP] European Pat. Off. ............ 92309520

[51] Int. Cl.⁶ .................. H04B 1/00; H04B 7/00
[52] U.S. Cl. ...................... 455/53.1; 455/33.1
[58] Field of Search ............... 455/53.1, 33.1, 455/33.3, 33.4; 343/853; 342/373, 374, 457; 379/59

[56] References Cited

U.S. PATENT DOCUMENTS

| | | | |
|---|---|---|---|
| 3,487,413 | 12/1969 | Shores | 343/754 |
| 4,128,740 | 12/1978 | Graziano | 179/2 |
| 4,626,858 | 12/1986 | Copeland | 342/374 |
| 5,093,668 | 3/1992 | Screenivas | 342/374 |

Primary Examiner—Reinhard J. Eisenzopf
Assistant Examiner—Marsha D. Banks-Harold

[57] ABSTRACT

A base station antenna arrangement comprising a plurality of antenna arrays each capable of forming a multiplicity of separate overlapping narrow beams in azimuth, the arrays being positioned such that the totality of beams formed by the arrays provides a substantially omni-directional coverage in azimuth, azimuth and elevation beamforming means for each array, a plurality of r.f. transceivers each for transmitting and receiving r.f. signals for one or more calls, switching matrix means for connecting each transceiver with one or other of the arrays via the beamforming means, control means for controlling the switching matrix means whereby a particular transceiver is connected to a particular array via the beamforming means to exchange r.f. signals with a remote station located in the area covered by one of the narrow beams.

10 Claims, 7 Drawing Sheets

OMNI-DIRECTIONAL CONFIGURATION
(N = 7 RE-USE FACTOR)

1st TIER RE-USE CELLS

Fig. 2(b).

TRI-SECTORED CONFIGURATION
(N = 7 RE-USE FACTOR)

1st TIER RE-USE CELL NON-INTERFERING

Fig. 2(c).

HEX-SECTORED CONFIGURATION
(N = 4 RE-USE FACTOR)

NARROW OVERLAPPING BEAMS

FIXED BEAMS

Fig.6(b).

SELECTED BEAMS AT TIME $t_1$

Fig.6 (c).
SELECTED BEAMS AT TIME t₂

| MOBILE CHANNEL ALLOCATION | BEAM NUMBER SELECTED ||
|---|---|---|
| | TIME $t_1$ | TIME $t_2$ |
| ms1 ALLOCATED CHANNEL 1 | b22 | b22 |
| ms2 ALLOCATED CHANNEL 2 | b2 | HANDED OFF TO ADJACENT CELL |
| ms3 ALLOCATED CHANNEL 3 | b2 | b4 |
| ms4 ALLOCATED CHANNEL 4 | b10 | b8 |

…

BASE STATION ANTENNA ARRANGEMENT

This application is a continuation, of application Ser. No. 08/137,834, filed Oct. 15, 1993, now abandoned.

This invention relates to a base station antenna arrangement for use in a Cellular Radio communication system.

BACKGROUND OF THE INVENTION

Cellular Radio systems are currently in widespread use throughout the world providing telecommunications to mobile users. In order to meet with capacity demand, within the available frequency band allocation, cellular radio systems divide a geographic area to be covered into cells. At the center of each cell is a base station, through which the mobile stations communicate. The available communication channels are divided between the cells such that the same group of channels are reused by certain cells. The distance between the reused cells is planned such that co-channel interference is maintained at a tolerable level.

When a new cellular radio system is initially deployed, operators are often interested in maximising the uplink (mobile station to base station) and downlink (base station to mobile station) range. The range in many systems are uplink limited due to the relatively low transmitted power levels of hand portable mobile stations. Any increase in range means that less cells are required to cover a given geographical area, hence reducing the number of base stations and associated infrastructure costs.

When a cellular radio system is mature the capacity demand can often increase, especially in cities, to a point where more smaller size cells are needed in order to meet the required capacity per unit area. The process used to create these smaller cells is known as cell splitting. Any technique which can provide additional capacity without the need for cell-splitting will again reduce the number of base station sites and associated infrastructure costs.

Figure 1A:
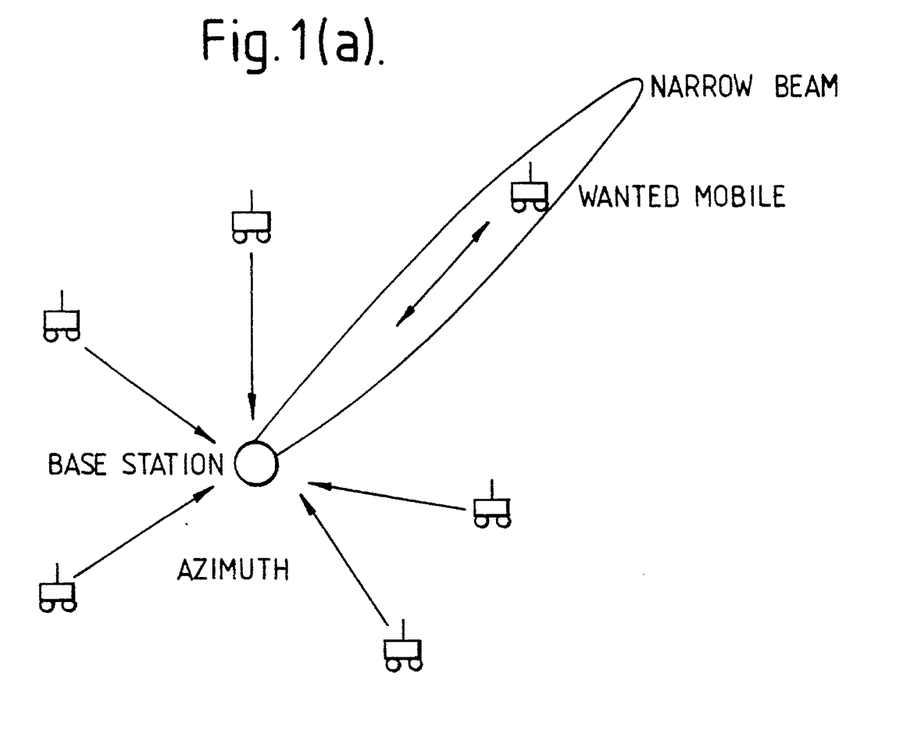
FIGS. 1a and 1b illustrate schematically the use of a narrow beam antenna to communicate between a base station and a mobile station.
Figure 1B:
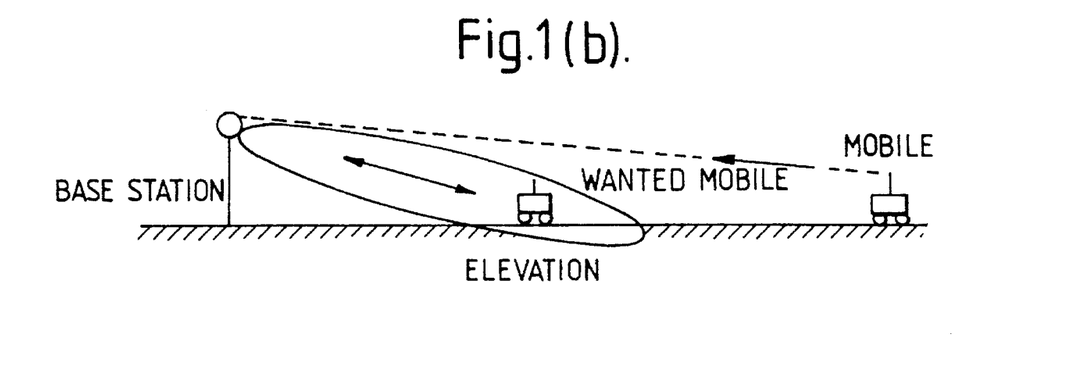

The antenna used at the base station site can potentially make significant improvements to the range and capacity of a cellular radio system. The ideal base station antenna pattern is a beam of narrow angular width as shown in FIG. 1a. The narrow beam is directed at the wanted mobile, is narrow in both the azimuth and elevation planes, and tracks the mobiles movements. When compared to an omni-directional antenna, such a beam will have the dual benefits of having high gain, leading to increased range in thermal noise limited initial deployments, and rejecting interference from co-channel reuse cells allowing higher capacity without cell splitting in mature deployments. The narrow beam reduces interference in a balanced manner on the uplink and downlink. On the uplink the base station receiver is protected from interference generated by mobile station transmitters in the co-channel reuse cells, FIG. 1b. On the downlink the mobile is unlikely to be in the beams of the base station transmitters in the co-channel reuse cells. The extent of the advantage of a narrow beam antenna over an omni-directional antenna is a function of the beamwidth the narrower the beamwidth the greater the advantage, but this must be traded off against the increased size and complexity of the antenna.

Although the narrow beam is formed at radio frequencies (typically in the 900 or 1800 MHz bands) it can usefully be visualized as analogue to a laser beam which emanates from the base station and tracks the mobiles. When contrasted with an omni-directional antenna this clearly creates a high quality transmission path with minimal interference.

Figure 2A:
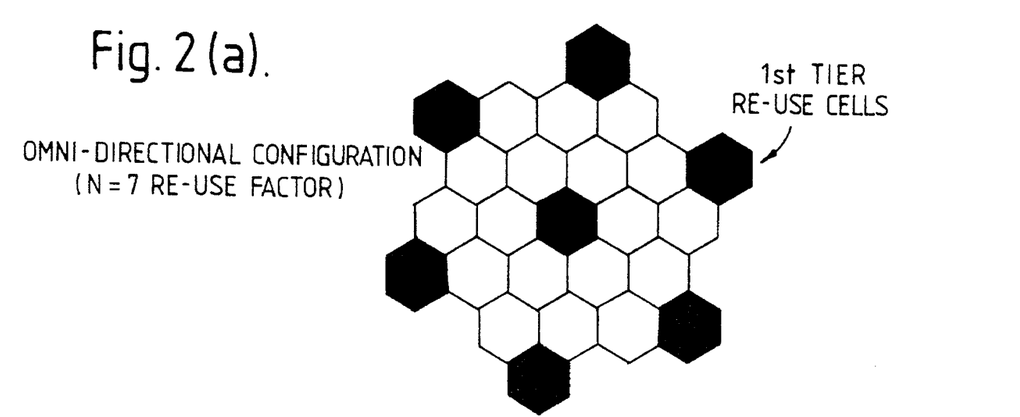
FIGS. 2a–2c illustrate schematically the principle of sectorisation of a base station.
Figure 2B:
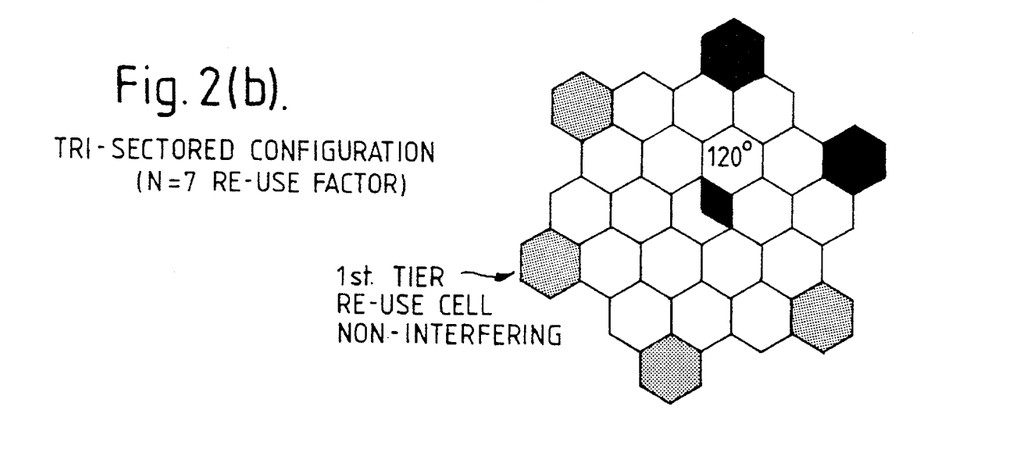
Figure 2C:
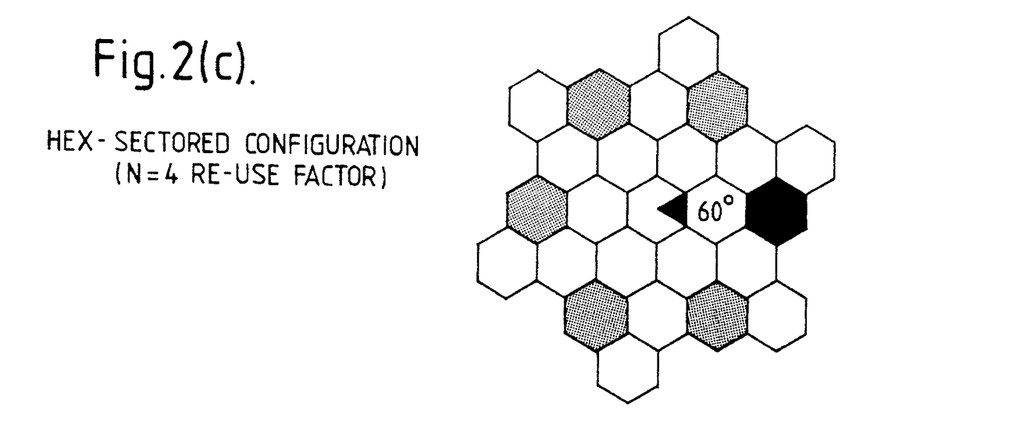

Some of the potential benefits of narrow beam antennas for cellular radio have been recognised in the literature, see for example "A Spectrum Efficient Cellular Base Station Antenna Architecture", S C Swales and M A Beach, Personal & Mobile Radio Communications Conference, Warwick, 1991 and "Proposed Advanced Base Station Antennas for Future Cellular Mobile Radio Systems", W S Davies, R J Long and E Vinnal, Australian Telecomms Research, Vol 22, No. 1, pp 53–60. Within current systems the manner in which directive antennas are used allows relatively small benefits to be obtained. The use of directive antennas in current cellular radio systems is based on the principle of sectorisation as illustrated in FIG. 2. The main sources of interference in a cellular system come from the so called first tier reuse cells. An omni-directional base station antenna will receive interference from all six first tier reuse cells (FIG. 2a). If an antenna with nominally 120° beamwidth is used, corresponding to a tri-sectored configuration, interference will be received from only two first tier reuse cells (FIG. 2b). If an antenna with 60° beamwidth is used, corresponding to a hexsectored configuration, interference will be received from only one of the first tier cells (FIG. 2c). In sectorised cells the cellular radio transceivers at the base station are only connected to one sector (or antenna) and cannot be used in other sectors within the same cell.

The sectorised approach to the use of directive antennas has reached its useful limit at 60° beamwidth and can go no further. There are two key disadvantages of the approach:

a) The cellular radio transceivers are dedicated to particular sectors which leads to significant levels of trunking inefficiency. In practice this means that many more transceivers are needed at the base station site than for an omni-directional cell of the same capacity b) Each sector is treated by the cellular radio network (i.e. the base station controller and mobile switches) as a separate cell. This means that as the mobile moves between sectors, a considerable interaction is required between the base station and the network to hand off the call between sectors of the same base station. This interaction, comprising signalling and processing at the base station controller and switch, represents a high overhead on the network and reduces capacity.

SUMMARY OF THE INVENTION

According to the present invention there is provided a base station antenna arrangement comprising a plurality of antenna arrays each capable of forming a multiplicity of separate overlapping narrow beams in azimuth, the arrays being positioned such that the totality of beams formed by the arrays provides a substantially omni-directional coverage in azimuth, azimuth and elevation beamforming means for each array, a plurality of r.f. transceivers each for transmitting and receiving r.f. signals for one or more calls, switching matrix means for connecting each transceiver with one or other of the arrays via the beamforming means, control means for controlling the switching matrix means whereby a particular transceiver is connected to a particular array via the beamforming means to exchange r.f. signals with a remote station located in the area covered by one of the narrow beams, the arrangement further comprising separate amplifying means for each beam.

BRIEF DESCRIPTION OF DRAWINGS

Embodiments of the invention will now be described with reference to the accompanying drawings, in which.

DESCRIPTION OF PREFERRED EMBODIMENT

Figure 3:
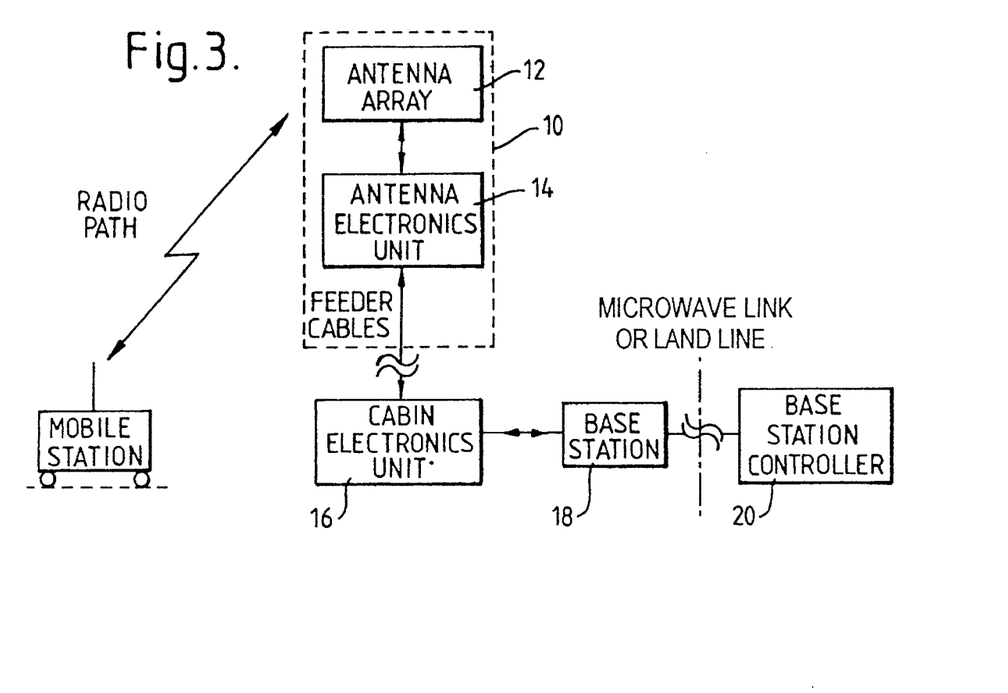
FIG. 3 is a block diagram of the main elements of a base station.

The main elements of a base station antenna arrangement as shown in FIG. 3 comprise a mast tower or building 10 supporting the antenna array(s) 12 and associated antenna electronics unit 14, which includes beamformers, diplexers and amplifiers. The antenna electronics unit 14 is connected via a cabin electronics unit 16 to the base station 18 which is under the control of a base station controller 20.

Figure 4A:
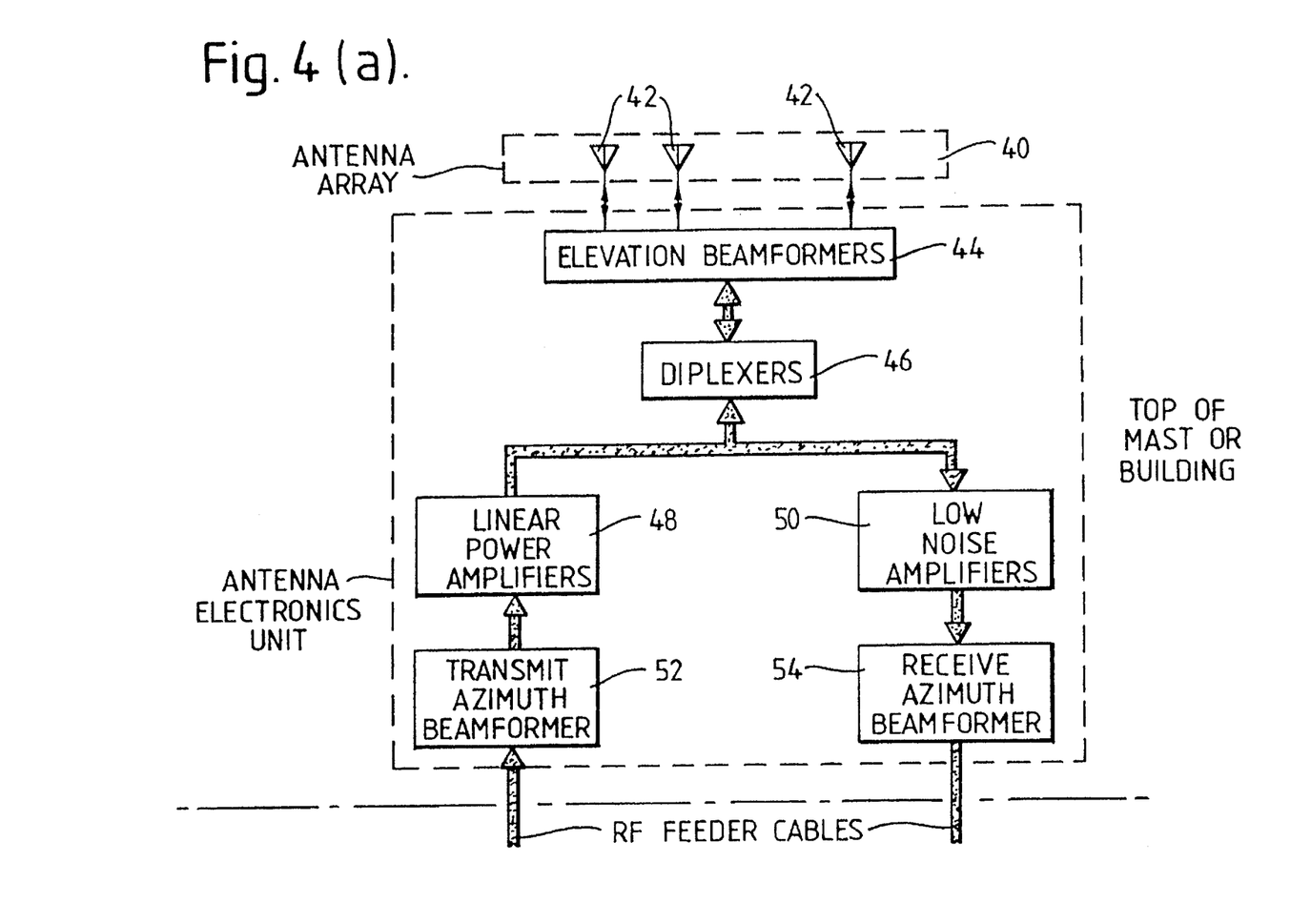
FIGS. 4(a) and 4(b) are a diagram of the constituents of a multiple narrow beam base station.
Figure 4B:
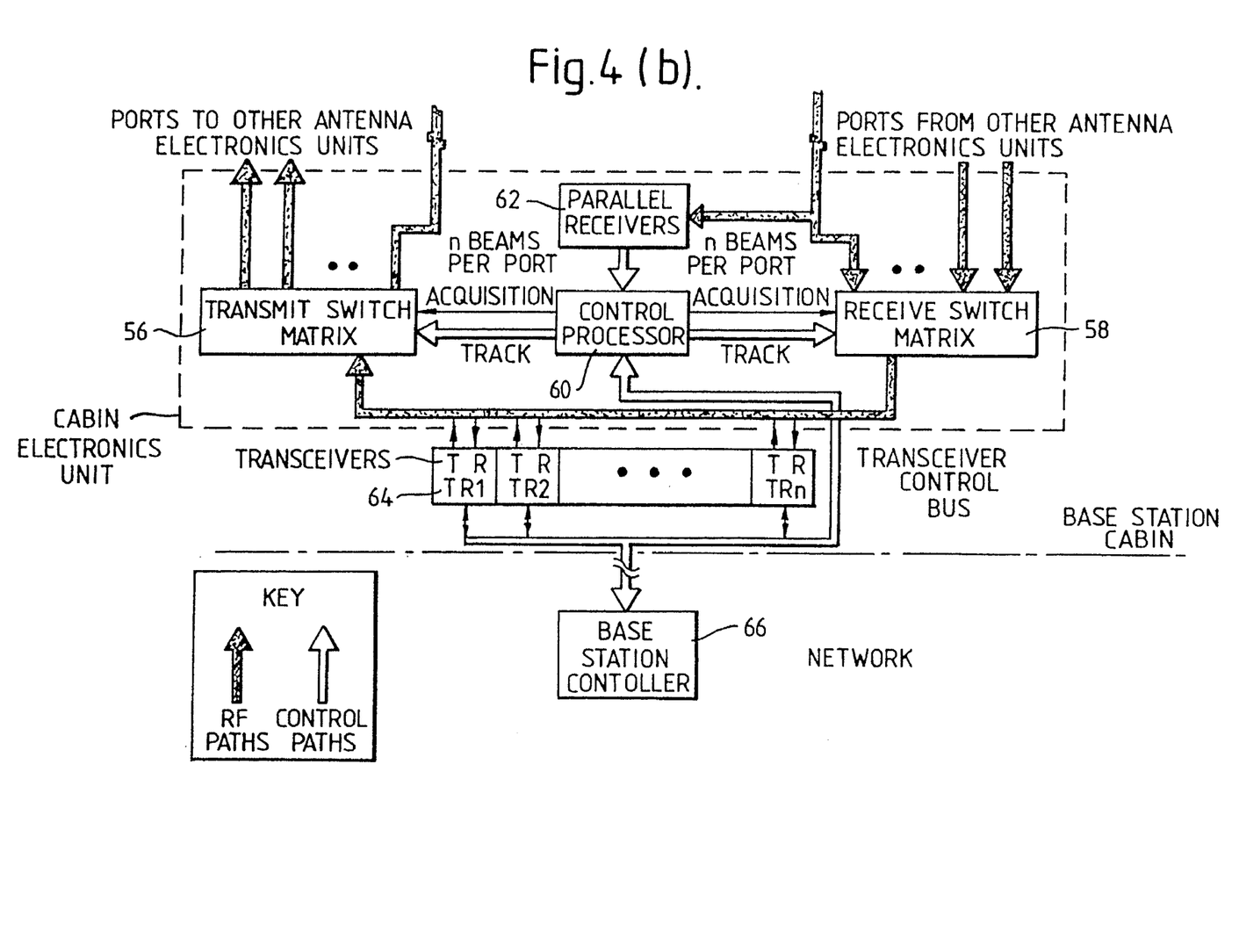

The detailed constituents of the base station antenna arrangement are shown in FIG. 4. Only one of the antenna arrays is depicted. Each antenna array 40 comprises a conventional array of individual antenna elements 42 arranged in rows and columns. Each column of elements is energized via an elevation beamforming network 44. Each elevation beamforming network combines the elements of a column to a single feed point. The amplitude and phase relationships of the r.f. signals coupled to the elevation beamformer determine the elevation beam pattern of the antenna for both transmit and receive. The transmit and receive signals for each elevation beamformer are coupled to the beamformer via individual diplexers 46. Filters which cover just the transmit or receive frequency bands respectively can be used for this purpose. In the transmit path the diplexers 46 are fed from separate linear power amplifiers 48, one for each elevation beamformer. These amplify the r.f. signals up to the power levels required for transmission. The power amplifiers need to have high linearity since the signals from every transmitter pass through the amplifiers simultaneously without producing significant inter-modulation products. In the receive path the diplexers 46 feed separate substantially identical low noise amplifiers 50, one for each elevation beamformer. The low noise amplifiers are required to amplify the weak received r.f. signals prior to any system losses to establish a low noise figure (high sensitivity)in the subsequent receive path.

The linear power amplifiers are in turn connected to the outputs of azimuth beamformers 52, one for each array. The azimuth beamformers have multiple output pods, one for each elevation beamformer, via the relevant linear power amplifier. The phase and amplitude relationship of the outputs to the beamformers control the azimuth beam pattern from the array. The beamformer has multiple input ports each of which provides a different azimuth beam in space. Likewise the receive path has a corresponding azimuth beamformer 54 for each array. This combines the multiple inputs from the elevation beamformers via the low noise amplifiers to provide multiple outputs each for a different azimuth beam in space. The phase and amplitude relationships used in the combination process control the azimuth beam shapes. The transmit and receive azimuth beamformers are substantially identical circuits used in a reciprocal manner. One well known type of beamformer is the Butler matrix.

Signals are passed to and from the azimuth beamformers by transmit and receive switch matrices 56 and 58. Each switch matrix comprises an r.f. cross-bar switch which allows any of its inputs to be connected to any of its outputs. The switch matrix design is such that any number of transmitters or receivers can be connected simultaneously to any one beamformer pod. Thus, if necessary, all the transmitters Can be connected to one beam port at a given time.

Figure 5:
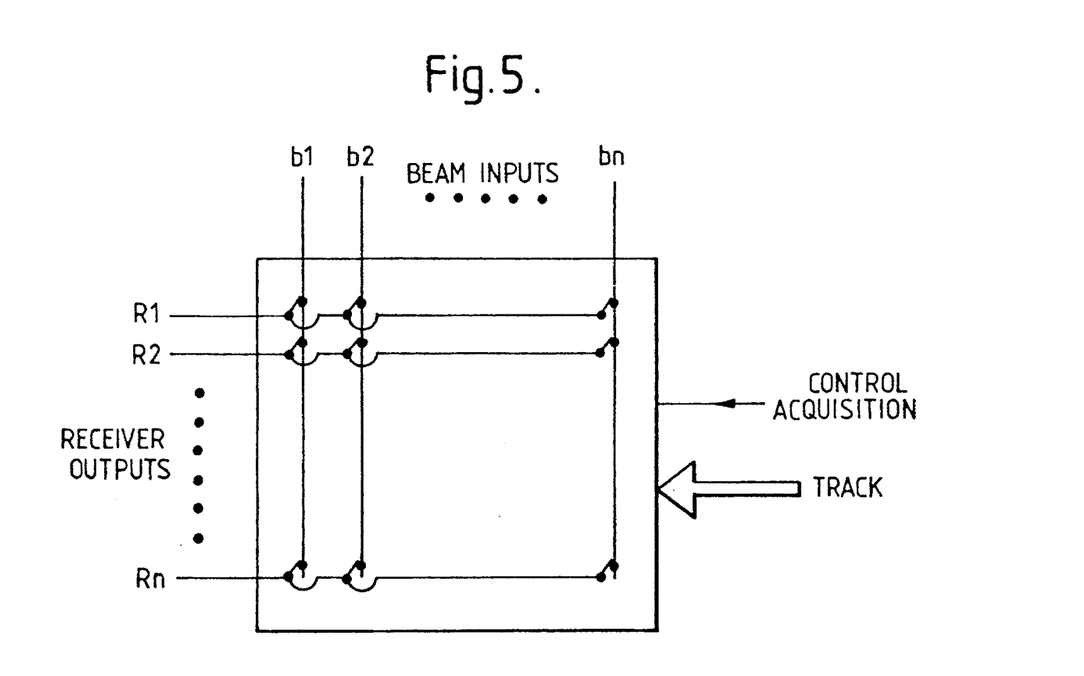
FIG. 5 illustrates the basic principle of a switching matrix.

Likewise all the receivers can be connected, if necessary, to the same beam port at the same time. The switch matrices are operated under the control of a control processor 60. A typical switch matrix structure is illustrated in FIG. 5. A bank of parallel receivers 62, one for each beam, allow every receive channel to be monitored on every beam simultaneously. For each channel the receivers measure the quality of the wanted mobile station signal present on each beam. The information on which is the 'best' beam is passed to the control processor. The quality measure used by the receivers will vary depending on the particular cellular system concerned. In simple, cases the measure will be the highest power level in other cases carrier to interference ratio will be used. The basic function of the control processor 60 is to control the transmit and receive switch matrices such that the best beam (normally the one pointing at the mobile stations geographic position) for a given channel is selected. The inputs to the control processor are the beam quality data from the parallel receivers and in some cases data from the transceiver control bus within the base station. The latter allows the control processor to monitor at given mobile station's assignment to various control and traffic channels in the system during the progress of a call. Knowledge of which channel the mobile is being moved to allows a prompt and non-disruptive assignment to the best beam. The control algorithms used will fall into two basic classes, one for initial acquisition of the best beam for a new call and one for tracking of the best beam when a call is in progress. It is anticipated that due to different multipath conditions the parameters within the control algorithms will vary for rural and urban cells. The determination of beam selection on the uplink is used to select the corresponding beam for the downlink. The switch matrices are coupled by r.f. bus paths to the bank of transceivers 64, one for each channel to be provided by the base station. The transceivers are operated under the control of the base station controller 66, which also provides overall control for the switch matrix control processor 60.

The key features of the invention can now be considered in more detail and contrasted to the conventional sectorised base station. It is not a single feature of the invention but rather the overall architecture (the functions and their precise disposition) which provides a practical and economic realisation of the narrow beam concept.

Considered from the network viewpoint, the narrow beam antenna system appears as an omni-directional cell site. Since any transceiver can be switched to any beam and hence look in any direction, there are no sectors. Thus, within the network all signalling and processing associated with sector to sector hand-offs is eliminated. Also the fact that transceivers can be used in any direction eliminates the trunking inefficiency of sectorised sites. These factors not only eliminate a significant load from the network but allow the antenna system to utilize effectively narrower beamwidths than would otherwise be possible.

The position of the amplifiers 48, 50 at the top of the mast or building is the key to the whole architecture. Firstly the concept of switching the transmitter to any beam is impractical unless it can be achieved without generating intermodulation products, or at least maintaining them at a very low level. This is not possible if one were to attempt to switch the power levels, which can be as high as 50 watts, at the transceiver outputs. It is necessary to switch before power amplification. Secondly if power amplification takes place at the foot of the mast or building, the r.f. feeder cables must be very low loss and become large and expensive. This would be a significant practical limitation on the number of beams one could have in a system.

By situating the amplifiers at the top of the mast or building the above problems are solved. However, the precise position in the architecture within the antenna electronics unit is still critical. Other factors which must be taken into account are that since the individual amplifiers now pass the signals from all transmitters simultaneously, intermodulation products must once again be at a very low level. Also since the amplifiers are at the top of the mast they must be extremely reliable and failures should produce gradual rather than catastrophic degradation in system performance.

The positioning of the linear power amplifiers 48 between the transmit azimuth beamformer 52 and the diplexers 46 provides an excellent compromise between the above factors and cost. If a complete linear power amplifier were to fail (which is unlikely because of their highly redundant design) the main effect would be a slight degradation in the sidelobe level of the beam patterns. If, by comparison, the linear power amplifiers had been placed at the input to the transmit azimuth beamformer a failure would mean the loss of an entire beam and the corresponding loss of coverage within the cell. Because the linear power amplifiers are distributed, one for each elevation beamformer, this means that the power of each amplifier is relatively small, the final combination being done in space by the antenna array 40. The low power of operation of the linear power amplifiers allows the intermodulation requirements to be met. Still lower power of operation could be achieved if the linear power amplifiers were placed on each antenna element. While this in itself would be practical the necessary diplexer per antenna element would not be.

A potential disadvantage of the invention is that a relatively large antenna aperture, in terms of wavelengths, is needed to produce the narrow beams. If the antenna aperture were very large this could create aesthetic and structural problems, due to wind loading etc., in some sites. This potential disadvantage is overcome by using the same antenna array 40 for transmit and receive. In this way the outline of the antenna, for reasonable beamwidth, is less than that of many conventional cell sites. Thus the diplexing of transmit and receive through the common aperture is a key feature of the architecture.

Figure 6A:
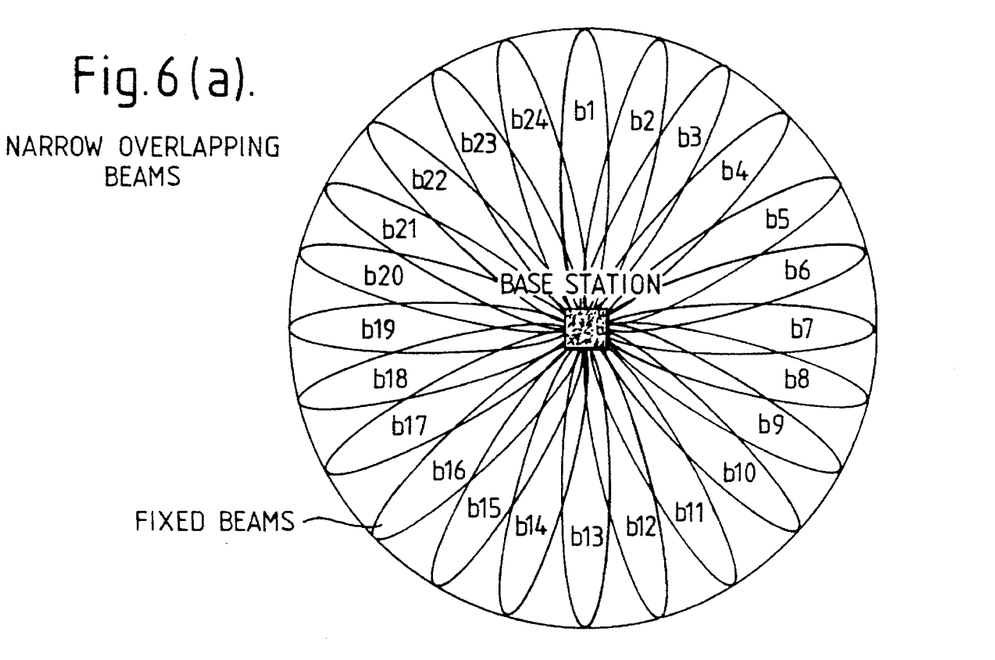
FIG. 6a, 6b and 6c illustrates the operation of a multiple narrow beam base station.
Figure 6B:
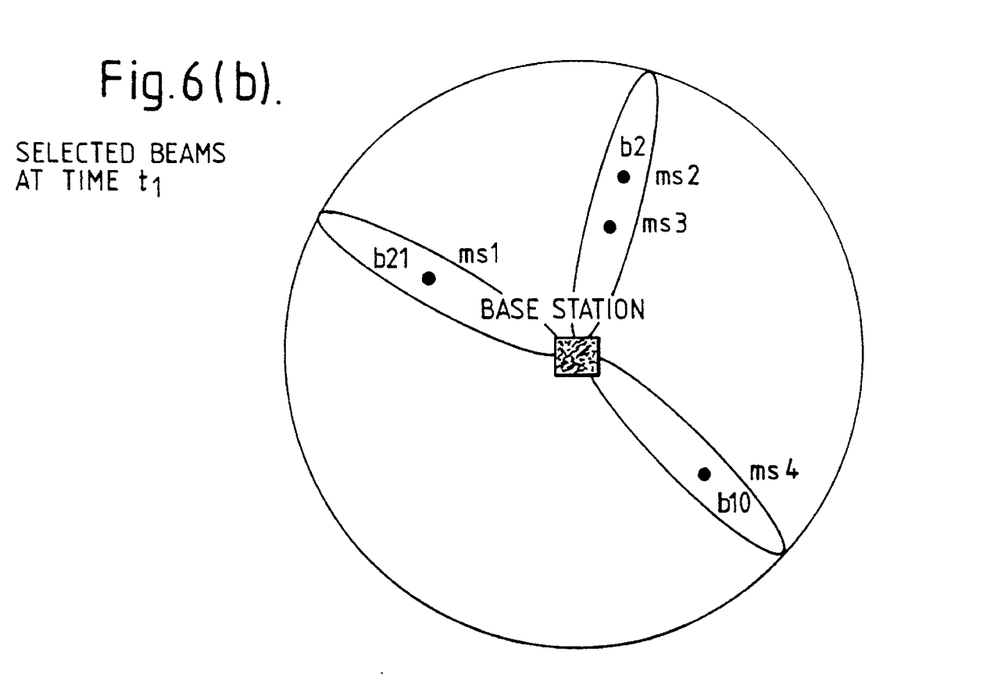
Figure 6C:
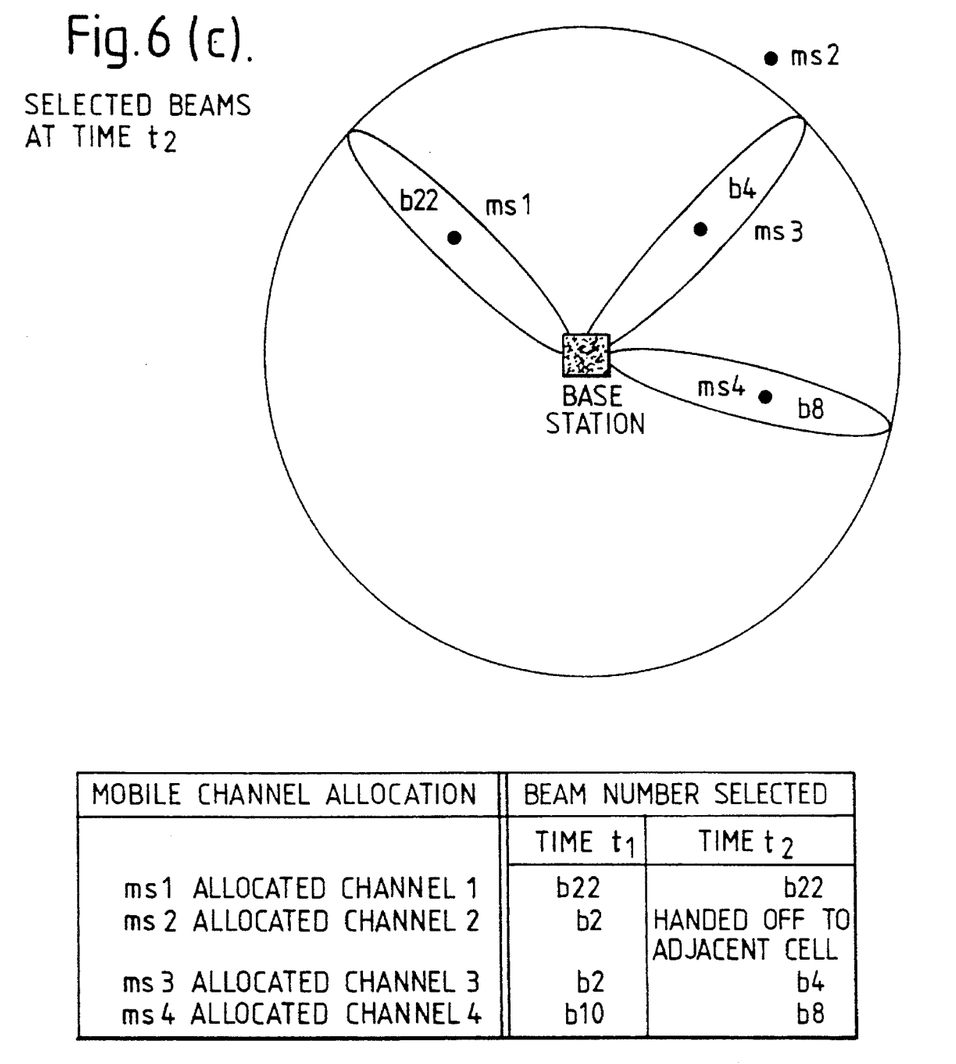

FIG. 6 illustrates the system operation. FIG. 6a shows the concept of a multiplicity of narrow, overlapping beams covering the cell area surrounding the base station. The beams are referenced b1–b24. FIG. 6b shows how, at time $t_1$ four mobile stations ms1–ms4 are served by beams b2, b10 and b21. Beam b2 serves two mobile stations ms2 and ms3 at this time. As the mobile stations move geographically in relation to the base station, at time $t_2$ beam b22 now serves mobile stations ms1, b4 serves ms3 and b8 serves ms4. Mobile station ms2 has, at time $t_2$ moved out of the cell coverage of this base station and will now be served by an adjoining base station (not shown).

We claim:

1. A non-sectorized base station arrangement comprising:

a plurality of antenna arrays, wherein each antenna array is capable of forming separate overlapping narrow beams in azimuth, a plurality of r.f. transceivers each for transmitting and receiving r.f. signals for one or more calls, switching matrix means, and control means;

wherein the control means is operable to switch a particular transceiver through the switching matrix means to any array whereby r.f. call signals can be exchanged with a mobile station located in any area covered by the narrow beams with the same transceiver.

2. An arrangement according to claim 1 further comprising separate amplifying means for each beam coupled between the switching matrix means and each array.

3. An arrangement according to claim 2 wherein transmission and reception are effected through a common antenna aperture.

4. An arrangement according to claim 2 wherein the antenna arrays comprise rows and columns of antenna elements, each array being provided with separate elevation beamforming means for each column of elements and separate transmit and receive azimuth beamforming means being coupled to all the elevation beamforming means via diplexer means.

5. An arrangement according to claim 1 wherein transmission and reception are effected through a common antenna aperture.

6. An arrangement according to claim 1 including means for monitoring the beam quality of each of the beams, the switch matrix control means being responsive to the beam monitoring means to control switching of calls during the progress of said calls.

7. An arrangement according to claim 1 wherein the antenna arrays comprise rows and columns of antenna elements, each array being provided with separate elevation beamforming means for each column of elements and separate transmit and receive azimuth beamforming means being coupled to all the elevation beamforming means via diplexer means.

8. An arrangement according to claim 7 wherein the amplifying means are situated between the azimuth beamforming means and the diplexer means.

9. A method of operating a non-sectorized base-station arrangement comprising a plurality of antenna arrays, wherein each antenna array is capable of forming separate overlapping narrow beams in azimuth, a plurality of r.f. transceivers each for transmitting and receiving r.f. signals for one or more calls, switching matrix means, and control means; wherein the control means is operable to switch a particular transceiver through the switching matrix means to any array whereby r.f. call signals can be exchanged with a mobile station located in any area covered by the narrow beams with the same transceiver; the method comprising the following steps:

for a given signal received from a mobile, determining the best beam to be selected on the uplink by measuring the quality of the received signal strength from the mobile;

selecting the antenna which would provide the best beam for a given channel on the downlink;

transmitting a signal from a transceiver, through a transmit switch matrix and through the selected antenna, to the mobile.

10. A method as claimed in claim 9 wherein the antennas are used both for transmit and receive and wherein the signals to be transmitted are directed through diplexing means before being transmitted by the antenna array and the signals to be received are directed through diplexing means before being routed through the switching matrix.

* * * * *